(12) United States Patent
Perkins

(10) Patent No.: US 7,944,803 B2
(45) Date of Patent: May 17, 2011

(54) TONE ARM ASSEMBLY

(76) Inventor: Allen Perkins, Berkeley, CA (US)

( * ) Notice: Subject to any disclaimer, the term of this patent is extended or adjusted under 35 U.S.C. 154(b) by 406 days.

(21) Appl. No.: 12/243,631

(22) Filed: Oct. 1, 2008

(65) Prior Publication Data

US 2010/0080108 A1    Apr. 1, 2010

(51) Int. Cl.
*G11B 3/12* (2006.01)
(52) U.S. Cl. ......................................................... 369/233
(58) Field of Classification Search ........................ None
See application file for complete search history.

(56) References Cited

U.S. PATENT DOCUMENTS

| | | | | |
|---|---|---|---|---|
| 4,332,024 A | * | 5/1982 | Orchard | 369/254 |
| 4,587,646 A | * | 5/1986 | Graham | 369/248 |
| 4,686,664 A | * | 8/1987 | Graham | 369/53.38 |
| 7,382,713 B2 | * | 6/2008 | Graham | 369/252 |
| 2003/0156527 A1 | * | 8/2003 | Warden | 369/172 |
| 2006/0203695 A1 | * | 9/2006 | Graham | 369/252 |
| 2007/0008868 A1 | * | 1/2007 | Riggle | 369/245 |

* cited by examiner

*Primary Examiner* — Mark Blouin
(74) *Attorney, Agent, or Firm* — Bay Area Technology Law Group PC

(57) ABSTRACT

A tone arm assembly for use with a rotatable turntable. The tone arm assembly includes a tone arm body supported adjacent to the rotating turntable being horizontally pivotable about a vertically extending axis. A tone arm tube is provided having a longitudinal axis and a first end and a second end, the first end extending within and being supported by the tone arm body and the second end terminating at a shell for releaseably supporting a pick up cartridge. A counterweight is included which is translatable along a horizontal path parallel to the longitudinal axis of the tone arm tube between a first position and a second position, the first position being closest to the shell and a second position being farthest from the shell to adjust contact pressure between a stylus maintained by the pick up cartridge and a record supported by the rotatable turntable. At least a portion of the counterweight is capable of extending fore and aft of the vertically extending axis when the counterweight is positioned on its horizontal path between its first and second positions.

10 Claims, 6 Drawing Sheets

TONE ARM ASSEMBLY

TECHNICAL FIELD

The present invention relates to an advanced tone arm assembly providing for vastly improved sound reproduction, stylus tracking and overall ease of operation. This invention can be used with virtually any rotatable turntable used in high fidelity installations.

BACKGROUND OF THE INVENTION

Turntables used to support and rotate vinyl records have been available for as long as high fidelity music reproduction has existed. Tone arms are usually of two configurations-those that radially translate along the record surface and those that are pivotally mounted at a fixed location adjacent to the rotating turntable, the latter configuration being the most popular as it generally requires less skill to install and maintains its appropriate operating parameters for an extending period without the need for routine adjustment.

Tone arms are generally supported in a cantilever fashion within a tone arm body which pivots on a vertically extending axis adjacent to the turntable. The tone arm tube supports a shell for receiving a pick up cartridge which, in turn, acts as a receiving body for a stylus. When in use, the stylus fits within a groove created within the vinyl record with the electrical output of the pick up cartridge begin proportional to the lateral displacement of the stylus by the grooved sidewalls. The stylus laterally vibrates within the grooves generally at right angles thereto while moving along a radius measured from the axis of the rotating turntable. Thus, the stylus moves through an arc or path generally at right angles to the grooves created within the vinyl recording. The groove, although being an almost perfect circle is, in fact, in the form of a spiral with its center located at the center of the disk.

In a typical assembly as described above, there are a number of dynamics at play, each of which potentially having a dramatic and profound effect upon the quality of sound reproduction available to a listener. A first critical feature is to properly establish and maintain the appropriate contact pressure between the stylus and the record groove. As noted, the stylus is intended to experience displacement by lateral vibration within the groove sidewalls, generally at right angles thereto. A stylus whose contact pressure is too great or not great enough will experience less than ideal displacement. Adjusting this parameter is generally done with a counterweight cantilevered well behind the pivot point of the tone arm body. Moving the weight closer to this pivot point generally increases the stylus contact pressure while, conversely, moving the weight further behind this pivot point lessens contact pressure. As pick up cartridges of various manufacturers differ dramatically in weight and suggested contact pressures, having the ability to adjust the downward force vector at the pick up cartridge is a necessary characteristic of any modern high quality tone arm assembly. In such an arrangement, however, the tone arm center of gravity is not always aligned with the assembly's bearing point which can attribute to sonic degradation.

Another dynamic which must be accounted for is the need to reduce the tendency of a stylus to "skate" across the record surface. This is because the force exerted on the stylus during playback is at an angle between a line tangent to the groove and a line between the stylus point and the pivot point of the tone arm creating a component of force directed radially inwardly of the record tending to pull the stylus of the center thereof. Conventionally, counterweights are hung at various positions proximate the tone arm body to exert forces tending to counter skating. However, as the skating forces vary depending upon the position of the stylus along the record surface, traditional anti-skating mechanisms create forces that may only be ideal at a certain stylus location but not when the stylus is located elsewhere.

Other considerations beyond those described above can be equally important. Specifically, the appropriate tone arm/turntable set up requires establishing the appropriate vertical tracking angle (VTA) which is the stylus rake angle between the stylus and groove This angle is normally adjustable by raising or lowering the tone arm body and is generally considered appropriate or "neutral" when the tone arm tube is parallel to the record surface.

Another parameter requiring some consideration is the azimuth. Looking at the cartridge body from its front, the angle of the stylus to the record surface should be perpendicular.

One most also consider the zenith and the amount of overhang between the stylus and shell to ensure that the stylus remains tangent to the record groove. Setting overhang amounts to aligning the cartridge so that the stylus can follow an ideal arc across the record although, when properly set, there are only several points (null points) when this actually occurs. Various gauges are available from tone arm manufacturers and third party suppliers for assisting a user in establishing the proper overhang.

Although great advances have been made in turntable design, standard counterweight assemblies fail to maintain the tone arm center of gravity at or near the tone arm bearing point which is an area requiring improvement to which the present invention is intended to address. Further, an anti-skate mechanism which improves the quality of forces experienced by the stylus along the record surface is another area improved upon by the present invention. Finally, the present disclosure suggests a modification in the standard pick up cartridge shell located at the end of the tone arm tube makes the job of establishing appropriate overhang much easier than in the past.

These and further improvements will become readily apparent when considering the following disclosure and appended claims.

SUMMARY OF THE INVENTION

A tone arm assembly for use with a rotatable turntable. The tone arm assembly includes a tone arm body supported adjacent to the rotating turntable and being horizontally pivotable about a vertically extending axis. A tone arm tube is provided having a longitudinal axis and a first end and a second end, the first end extending within and being supported by the tone arm body and the second end terminating at a shell for releaseably supporting a pick up cartridge. A counterweight is included which is translatable along a horizontal path substantially parallel to the longitudinal axis of the tone arm tube between a first position and a second position, the first position being closest to the shell and a second position being farthest from the shell to adjust contact pressure between a stylus maintained by the pick up cartridge and a record supported by the rotatable turntable. The counterweight and tone arm body are positioned such that at least a portion of the counterweight is capable of extending fore and aft of the vertically extending axis when the counterweight is positioned on its horizontal path between its first and second positions.

The invention further is directed to a tone arm assembly for use with a rotating turntable, the tone arm assembly comprising a tone arm body supported adjacent to the rotating turntable and being horizontally pivotable about a vertically extending axis. A tone arm tube is again provided having a longitudinal axis and a first end a second end, the first end extending within and being supported by the tone arm body and the second end terminating at a shell for releasably supporting a pick up cartridge. A weight is tethered from an umbilical for creating a force urging the pick up cartridge away from the center of the rotatable turntable, by providing a cam defining a surface of the tone arm body over which the umbilical passes.

In either of the embodiments discussed above, the shell can be configured with an opening for establishing appropriate overhang of the shell with respect to the pick up cartridge.

DETAILED DESCRIPTION OF THE INVENTION

Figure 1:
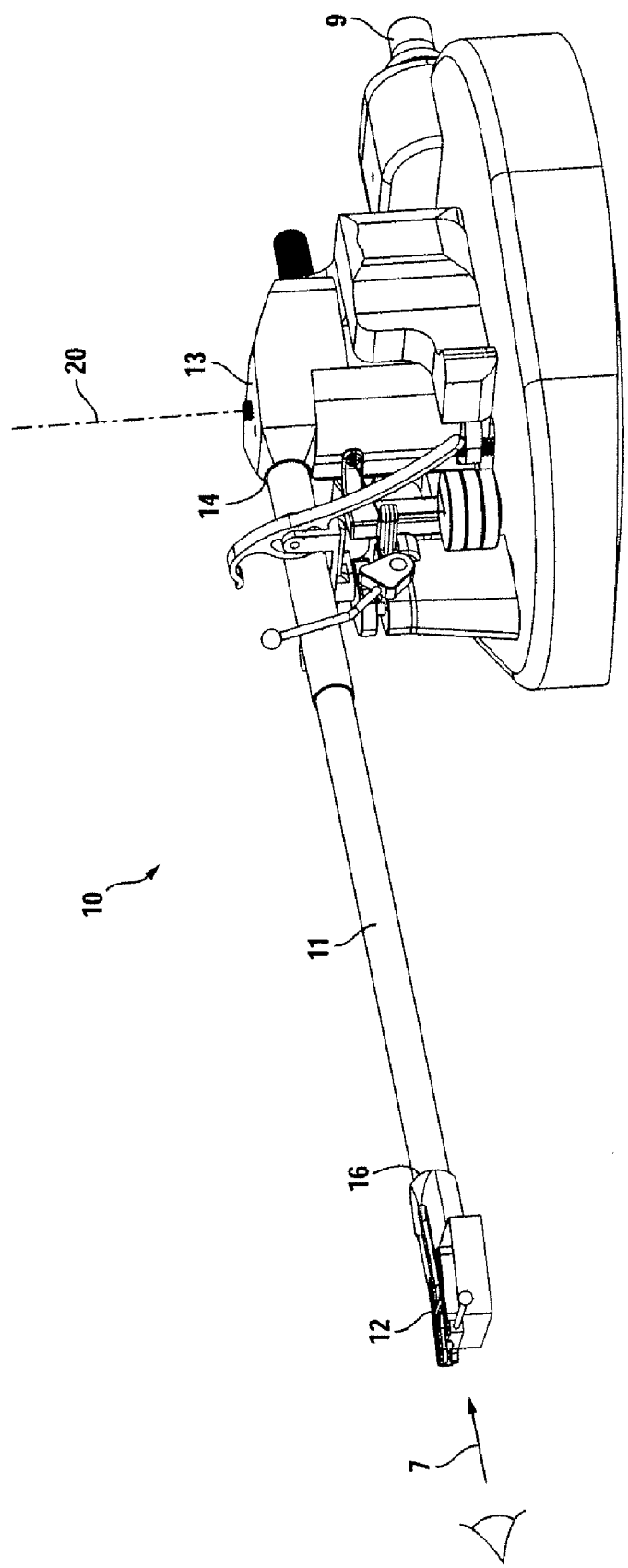
FIG. 1 is a perspective view of the tone arm assembly of the present invention.
Figure 5:
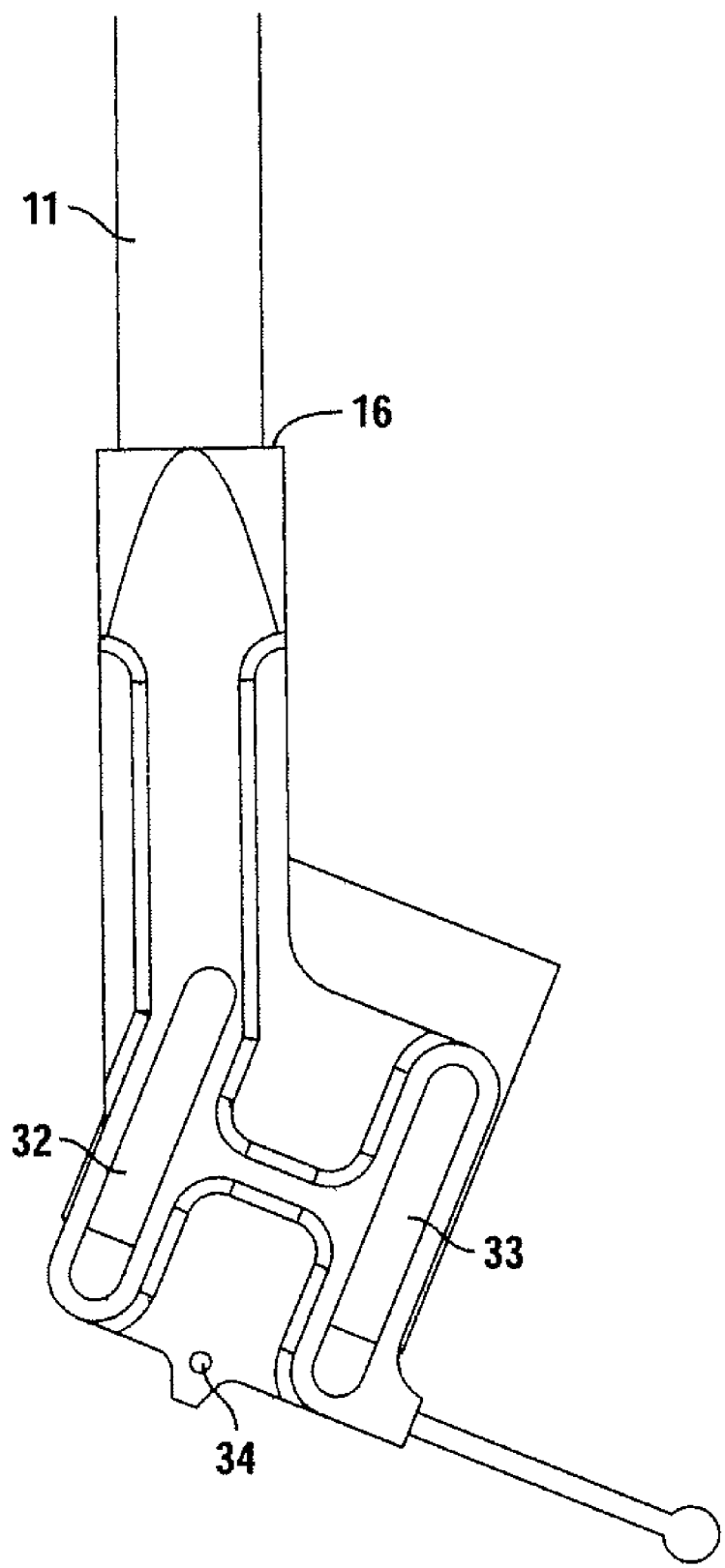
FIG. 5 is a top view of the shell and terminal end of the tone arm tube of the present invention.
Figure 6:
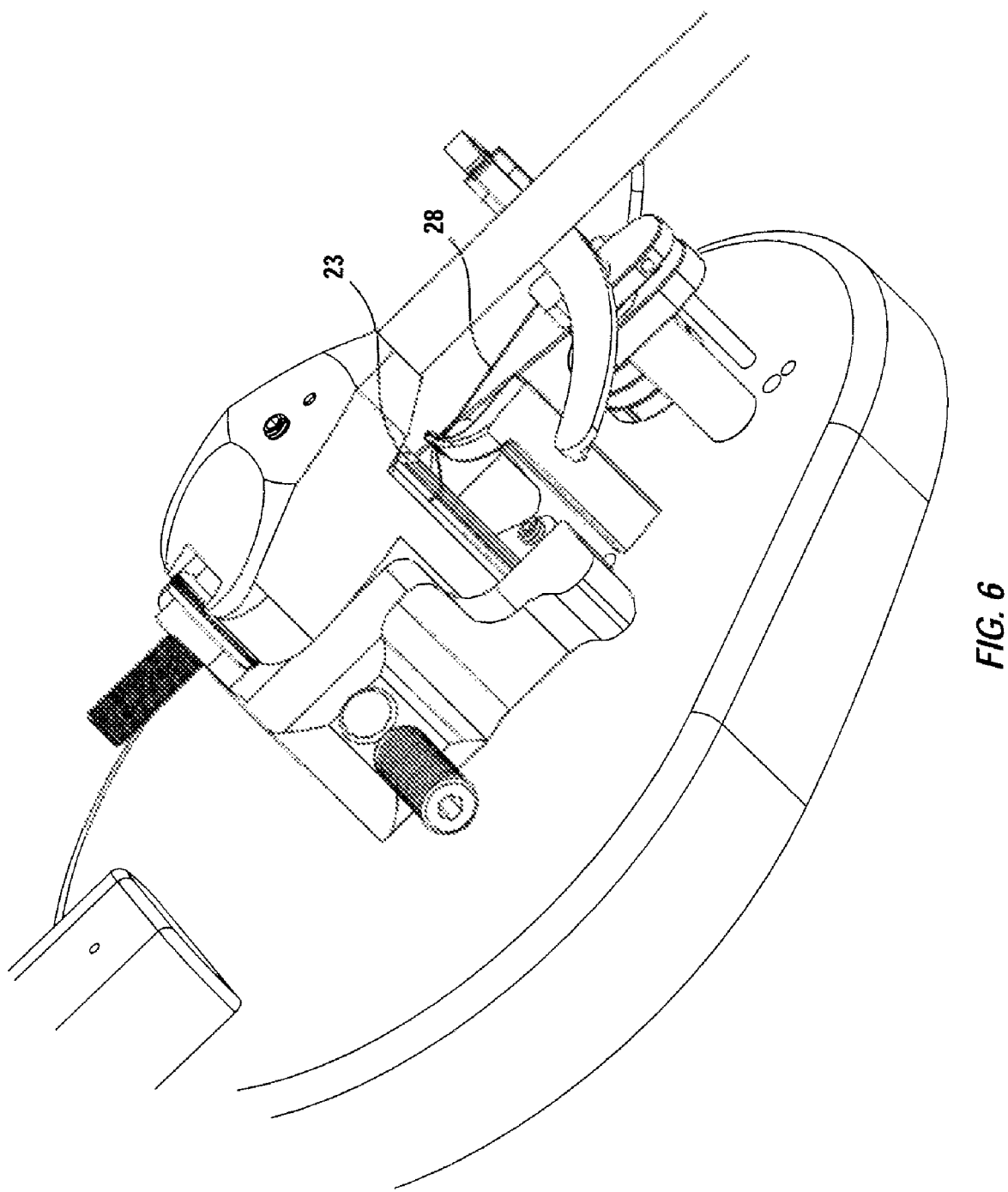
FIG. 6 is yet another expanded perspective view of a portion of the tone arm assembly of the present invention.

Turning first to FIG. 1, an overview of the tone arm assembly of the present invention is provided. Specifically, assembly 10 is intended to be installed upon a turntable base (not shown) which houses a rotating platter (not shown) for supporting and rotating a vinyl recording at a pre-described precise speed, typically 33⅓, 45, 78 rpm. A cartridge and supporting stylus is held in place beneath shell 12 for moving in response to information contained within a groove of an appropriately supported vinyl recording. The cartridge is maintained beneath shell 12 by passing fasteners, such as allen screws within channels 32/33 (FIG. 5). Movement of the stylus is converted to electrical energy within the cartridge which is translated through fine wires generally contained within tone arm tube 11, passing from tone arm assembly 10 to an appropriate preamplifier from output connection 9.

Figure 2:
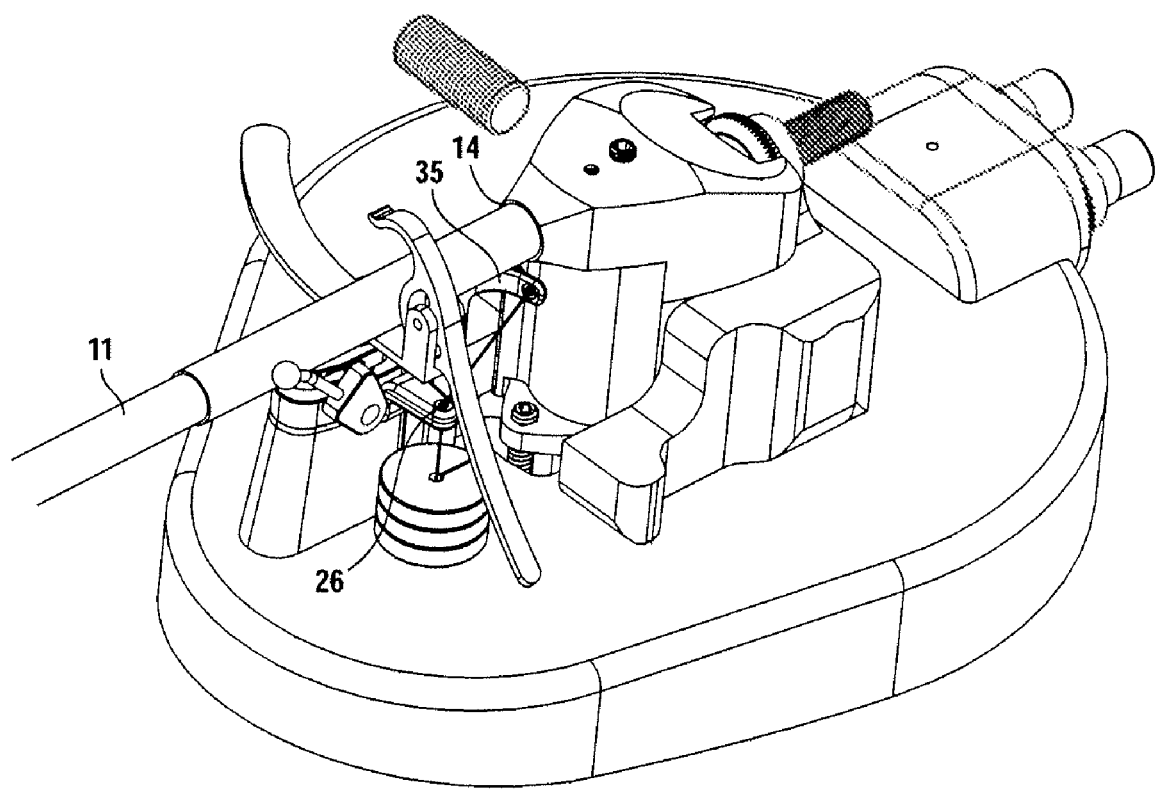
FIG. 2 is an expanded perspective view of a portion of the tone arm assembly of the present invention.

Tone arm assembly 10 includes tone arm body 13 horizontally rotatable about vertically extending axis 20 (FIG. 2).

Tone arm tube 11 constructed of a suitable lightweight yet rigid material such as aluminum or carbon fiber is characterized as having a first end 14 extending within and being supported by tone arm body 13. The second end 16 of tone arm tube 11 terminates with shell 12 which, as described above, supports a suitable pick up cartridge.

As previously noted, in that pick up cartridges can vary dramatically in weight while cartridge manufacturers suggest their own range of stylus pressures to achieve optimal sound reproduction, it is necessary in any such assembly that an adjustable counterweight be provided. Counterweights typically are cantilevered well behind the tone arm body by extending a tube, much like the tone arm tube to the rear of the tone arm body upon which weights are suspended and moved fore or aft to vary stylus contact pressure. In doing so, however, it is difficult to keep the center of gravity of the tone arm at or near the arm's bearing point, or, in other words, at or near vertically extending axis 20 throughout the adjustment limits of the counterweight. To improve this situation, placement of counterweight 15 will now be discussed, In referring to FIGS. 2, 3 it is noted that counterweight 15, being generally U-shaped is translatable along a substantially horizontal path 21 substantially parallel to the longitudinal axis of tone arm tube 11 between a first position and a second position, the first position being closest to shell 12 and the second position being furthest from shell 12 to adjust contact pressure between the stylus maintained by the pick up cartridge and the record surface. It is noted that counterweight 15 and tone arm body 13 are positioned with respect to one another such that at least a portion of counterweight 15 is capable of extending fore and aft of vertical axis 20 when the counterweight is positioned on horizontal path 21 between its first and second positions. In other words, counterweight 15 and body 13 are positioned such that at least a portion of counterweight 15 extends fore of vertically extending axis 20 at least when counterweight 15 is between at its first position. In doing so, legs 2 and 3 of counterweight 15 extend on either side of tone arm body 13 thus contributing to the goal of maintaining the center of gravity of counterweight 15 as close as possible to the tone arm's bearing point or, in other words, vertical extending axis 20.

In referring to FIG. 2, it is noted that counterweight 15 is ideally movable along horizontal path 21 by providing threaded shaft 17 fixed at one end within tone arm body 13 and supporting curled knob 18. As curled knob 18 is turned clockwise and counterclockwise, counterweight 15 moves along substantially horizontal path 21 enabling a user to finely adjust stylus contact pressure.

Figure 3:
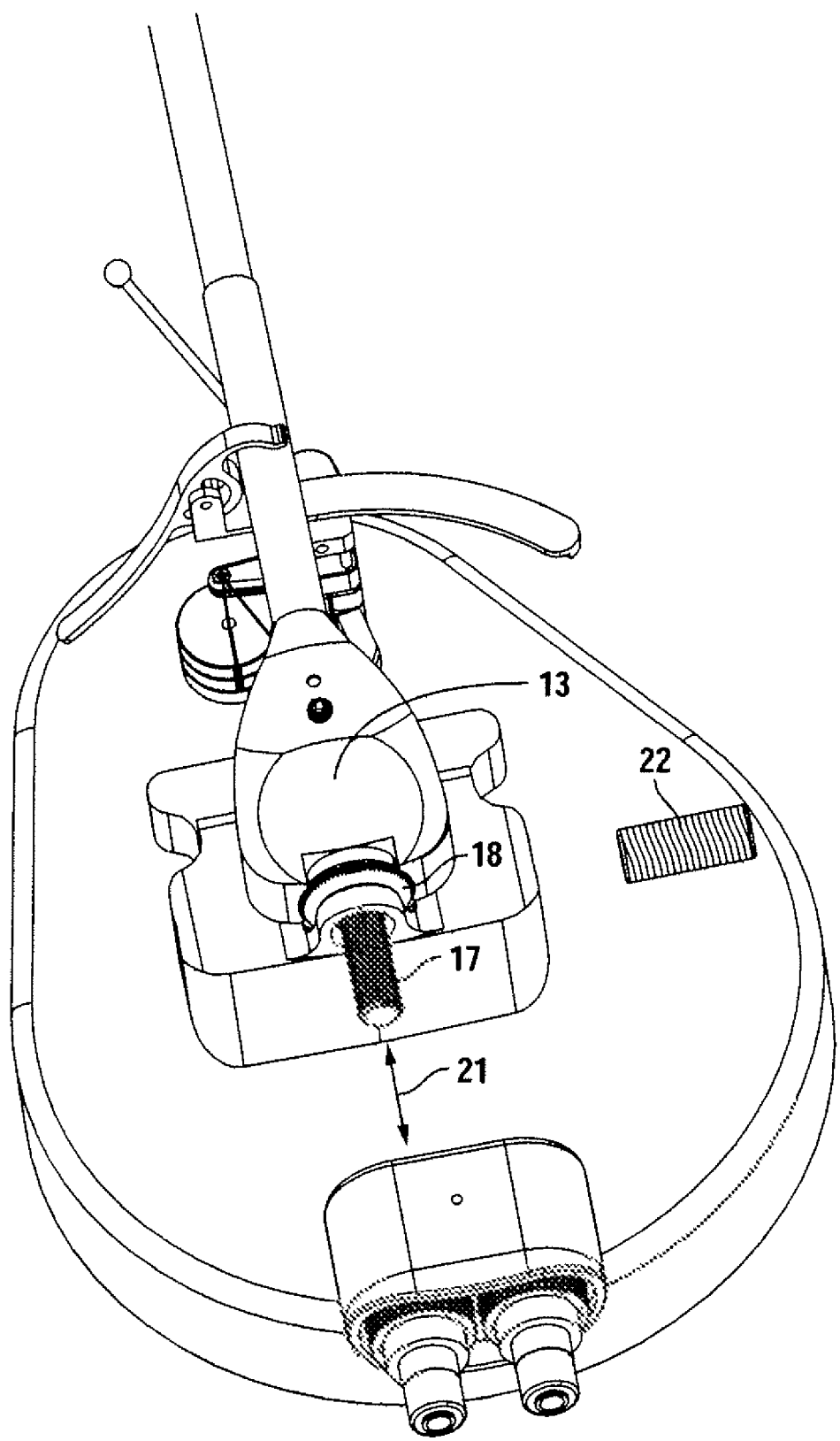
FIG. 3 is a partially exploded top perspective view of a portion of the tone arm assembly of the present invention.

As previously mentioned, another critical parameter having a profound impact upon sound reproduction is the azimuth or the angle that the stylus makes to the record surface. Ideally, the stylus should be perpendicular to the record surface when viewed from position 7 (FIG. 1). Reference is made to FIGS. 2 and 3 for visualizing a convenient way to make azimuth adjustments pursuant to the present invention.

For providing azimuth adjustment, bore 19 is created within counterweight 15. Bore 19 is threaded and is intended to receive complimentary threaded shaft 22 (shown in FIG. 3 as an exploded view). By selectively engaging varying portions of shaft 22 within bore 19, the relative weight of the assembly can be "fine tuned" on either side of the longitudinal axis of tone arm tube 11 which, in turn, can cause a slight shifting in the orientation of shell 12 and subsequent adjustment of the azimuth between the stylus and record surface.

Figure 4:
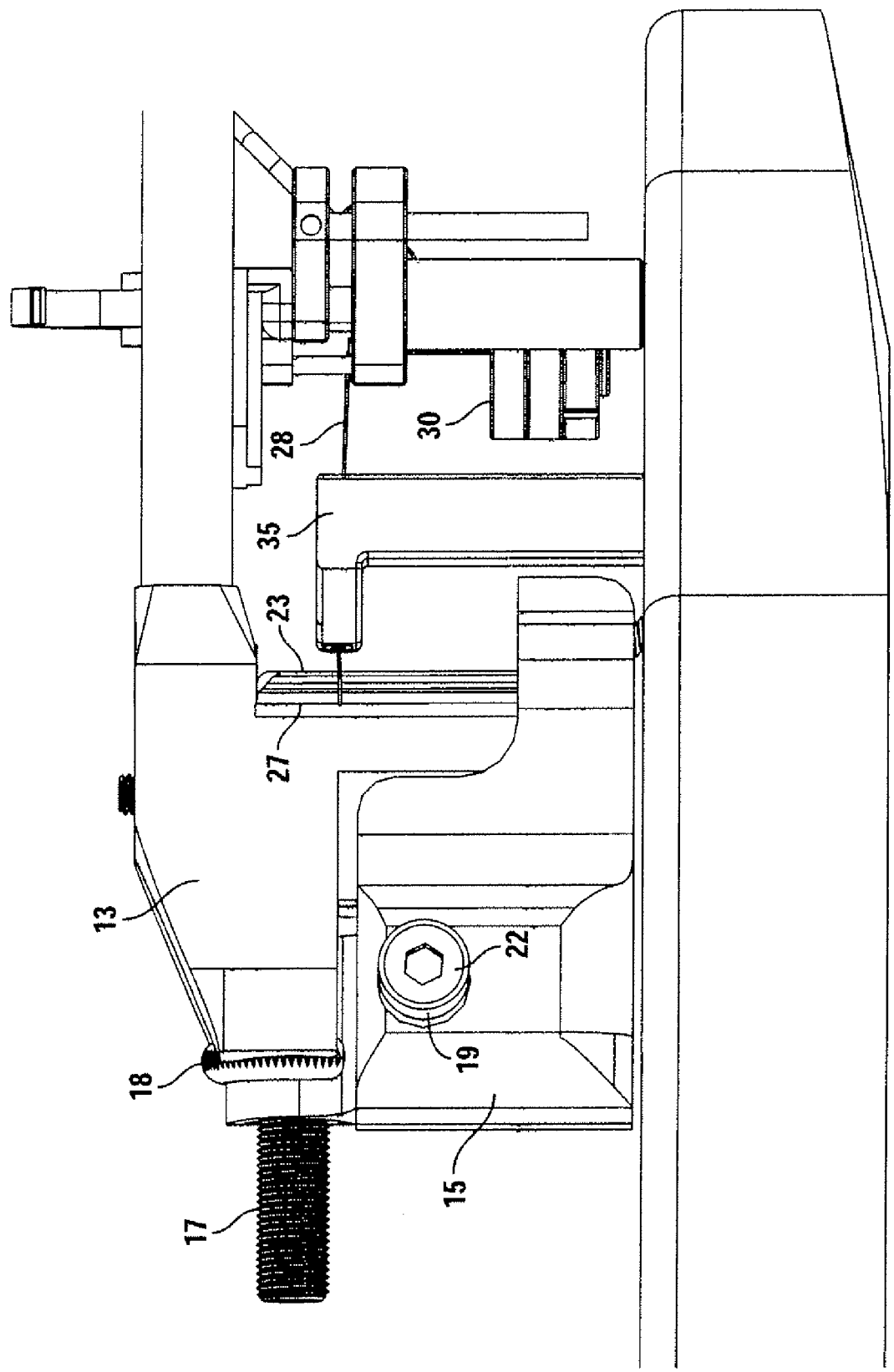
FIG. 4 is a side view of the tone arm assembly of the present invention.

As noted previously, tone arm body 13 is provided with a curved or cam surface 23, best seen by reference to FIG. 4. This was created as part of the assembly's ability to adjustably resist the tendency of the stylus to skate across a record surface from its outside edge to its center. The present invention accomplishes this task by providing an upstanding support 27 to which a fine thread or wire 28 is affixed. Thread or wire 28 passes through fixtures 35 and islet 26 through which thread or wire 28 passes to then engage weight 30. In operation, as tone arm tube 11 passes from the outer edge of the rotating vinyl disk through its journey to the label area proximate the center of the disk, thread or wire 28 passes over cam surface 23 raising weight 30. Because of the nature of cam surface 23, the anti-skate force applied to the stylus is uneven resulting in appropriate and uniform anti-skating properties throughout the radial travel of the stylus from the outer edge to the disk's label area.

Finally, as previously noted, it is important that the stylus be positioned the appropriate distance from vertical axis 20 to the center of rotation of the rotatable turntable. This is accomplished by providing the appropriate overhang of shell 12 vis-à-vis the cartridge body. Many tools are provided for this purpose but, in virtually all instances, it s difficult if not impossible to determine appropriate overhang when viewed from the top of the shell. To improve upon this matter, hole 34 (FIG. 5) is configured within the planar body of shell 12 and in so doing, various commercially available adjustment tools can be aligned more easily. Further, cartridge manufacturers can configure a complimentary hole or other type of target on the cartridge body to be aligned with hole 34 making the overhang measurement quite easily to perform.

The foregoing detailed description has been given to enable one skilled in the art to appreciate the present invention. No unnecessary limitations are to be drawn there from as modifications will be obvious to those skilled in the art. As such, the present invention should be limited only by the scope and extent of the following claims.

What is claimed is:

1. A tone arm assembly for use with a rotatable turntable, said tone arm assembly comprising a tone arm body supported adjacent said rotatable turntable being horizontally pivotable about a vertically extending axis, a tone arm tube having a longitudinal axis and a first end and a second end, said first end extending within and being supported by said tone arm body and said second end terminating at a shell for releasably supporting a pick up cartridge, a counterweight translatable along a substantially horizontal path substantially parallel to the longitudinal axis of said tone arm tube between a first position and a second position, said first position being closest to said shell and said second position being farthest from said shell to adjust contact pressure between a stylus maintained by said pick up cartridge and a record supported by said rotatable turntable, wherein at least a portion of said counterweight is capable of extending fore and aft of said vertically extending axis when said counterweight is positioned on said horizontal path between said first and second positions.

2. The tone arm assembly of claim 1 wherein at least a portion of said counterweight extends fore of said vertically extending axis when said counterweight is at said first position.

3. The tone arm assembly of claim 1 wherein said counterweight overlaps said vertically extending axis at some but not all positions along said horizontal path between said first and second positions.

4. The tone arm assembly of claim 1 wherein said counterweight is substantially U-shaped.

5. The tone arm assembly of claim 4 wherein legs of said U-shaped counterweight extend on either side of said tone arm body when said portion of said counterweight extends fore of said vertically extending axis.

6. The tone arm assembly of claim 1 wherein said counterweight further comprises a bore extending therein approximately perpendicular to the longitudinal axis of said tone arm tube and further comprising a shaft adjustably extending within said bore for adjusting the azimuth of a stylus extending from said pick up cartridge.

7. The tone arm body of claim 6 wherein said bore and shaft are threaded members.

8. In a tone arm assembly for use with a rotatable turntable, said tone arm assembly comprising a tone arm body supported adjacent said rotatable turntable and having said tone arm body horizontally pivotable about a vertically extending axis, a tone arm tube having a longitudinal axis and a first end and a second end, said first end extending within and being supported by said tone arm body and said second end terminating at a shell for releasably supporting a pick up cartridge and a weight tethered from an umbilical for creating a force of urging said pick up cartridge away from the center of said rotatable turntable, the improvement comprising a cam defining a surface of said tone arm body over which said umbilical passes.

9. The tone arm assembly of claim 8 wherein the amount of said force urging said pick up cartridge away from the center of said rotatable turntable varies depending upon where said umbilical contacts said cam surface.

10. In a tone arm assembly for use with a rotatable turntable, said tone arm assembly comprising a tone arm body supported adjacent said rotatable turntable and having said tone arm body horizontally pivotable about a vertically extending axis, a tone arm tube having a longitudinal axis and a first end and a second end, said first end extending within and being supported by said tone arm body and said second end terminating at shell for releaseably supporting a pick up cartridge, the improvement comprising an opening in the shell positioned for establishing appropriate overhang of the shell with respect to said pick up cartridge.

\* \* \* \* \*